3,123,457
SEPARATION OF AIR INTO NITROGEN, OXYGEN, ARGON, ETC.
Donald E. Smith, Summit, N.J., assignor to Air Reduction Company, Incorporated, a corporation of New York
Filed Dec. 22, 1960, Ser. No. 77,577
6 Claims. (Cl. 62—13)

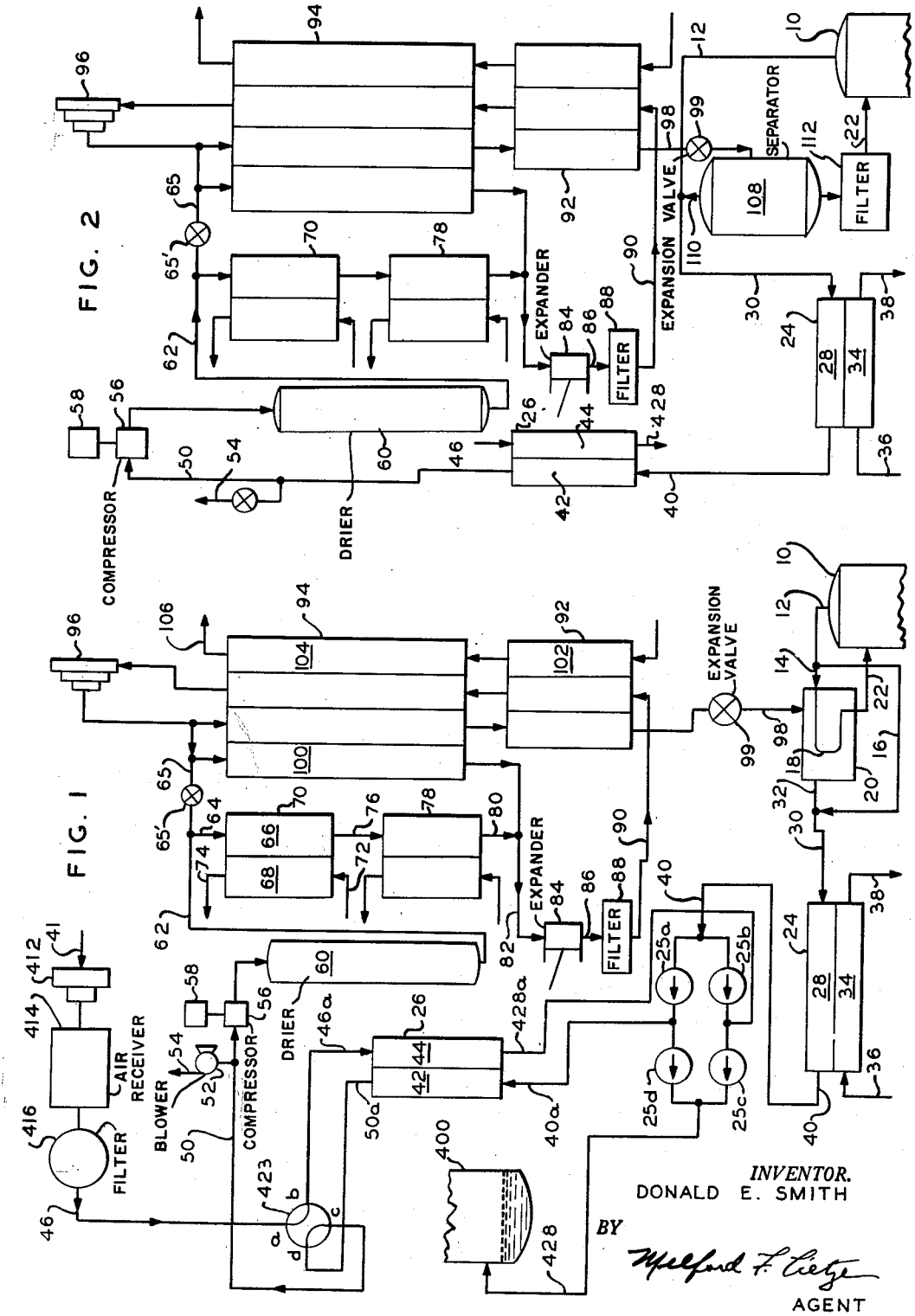

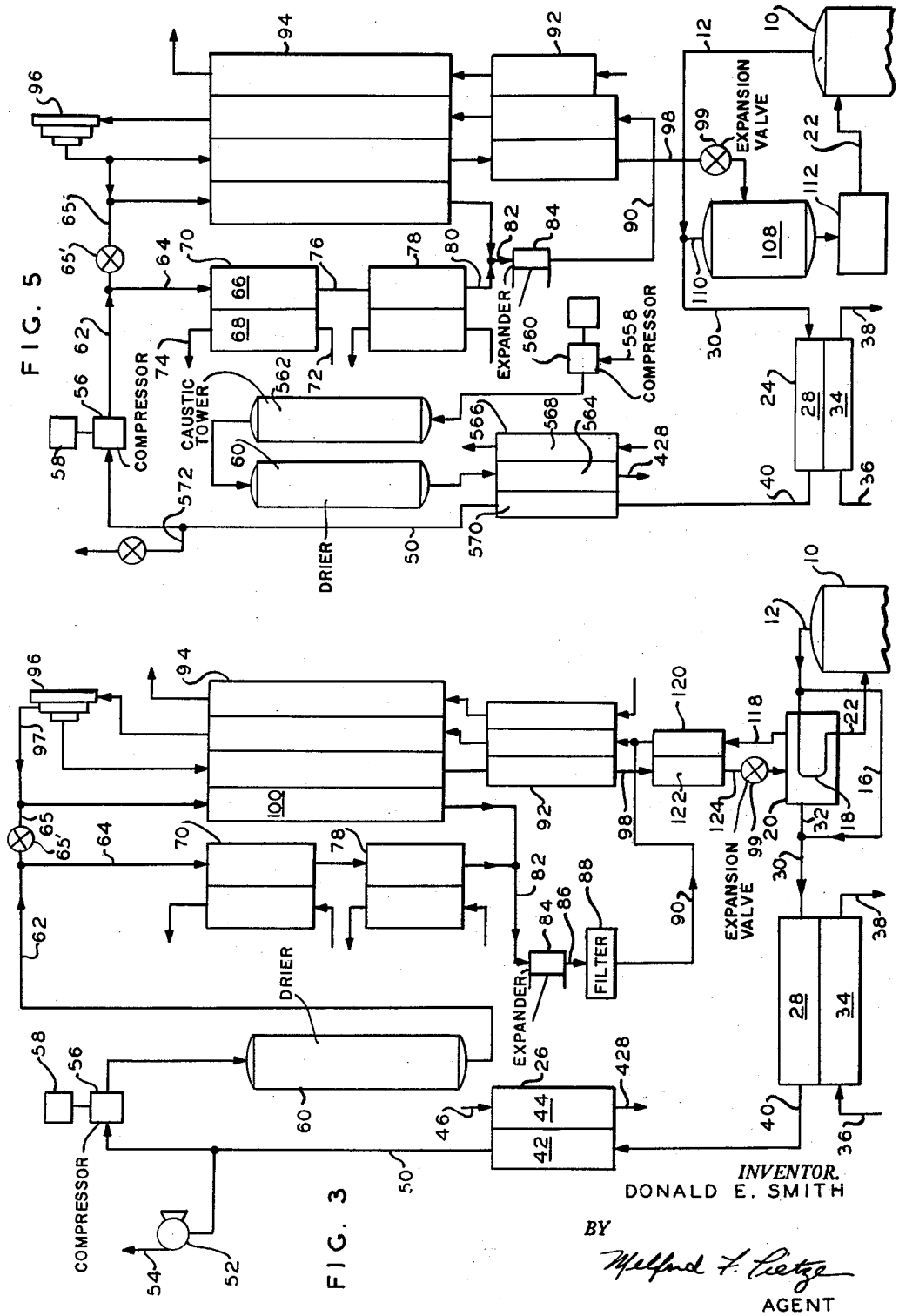

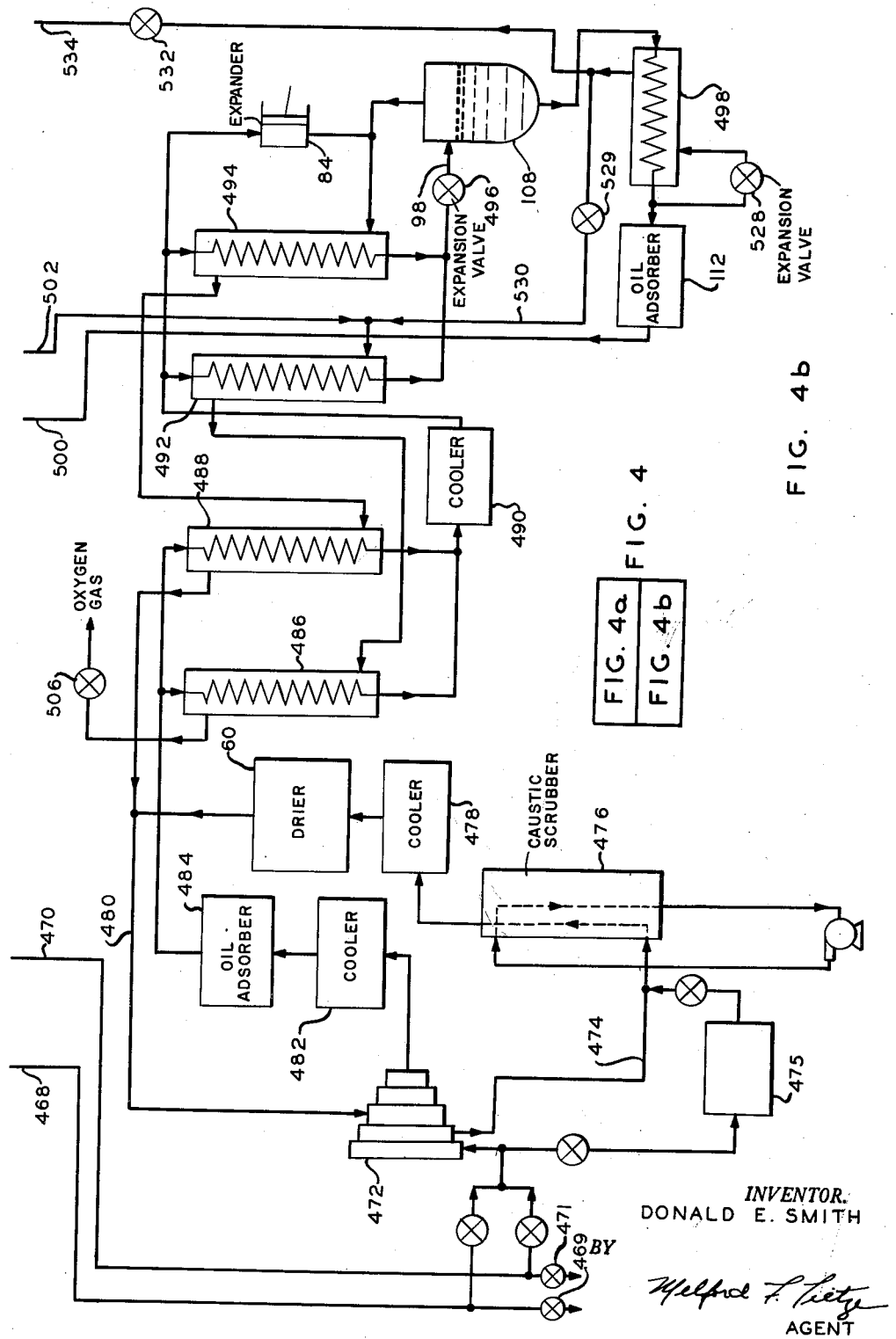

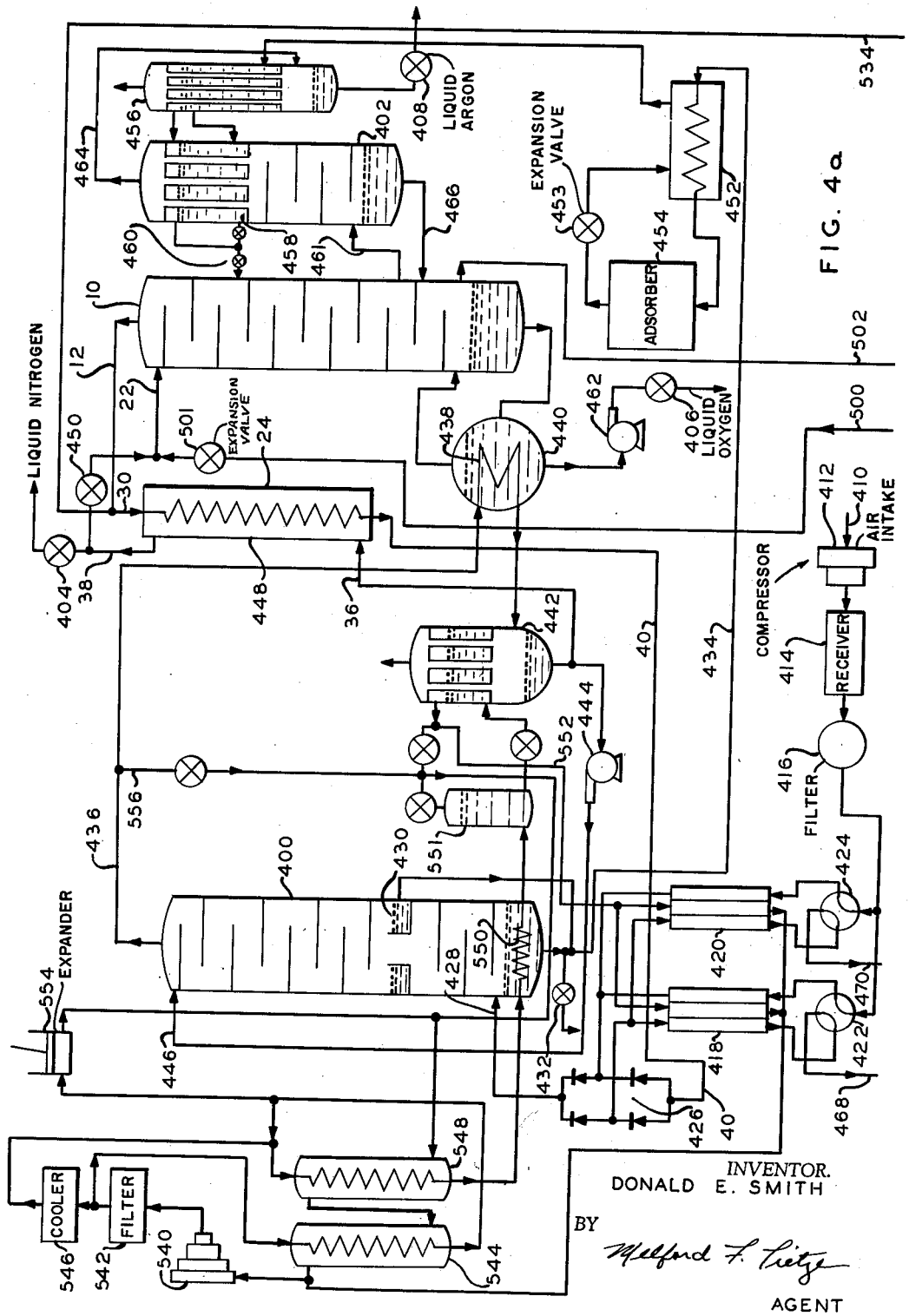

This invention relates to the separation of the elements of air by liquefaction into high purity liquid and gaseous products, and more particularly relates to an improved process and apparatus for increasing production of liquid nitrogen without sacrifice of the potential of the plant for simultaneously producing oxygen, argon or other products.

The invention has particular application to those processes and systems wherein high purity effluent nitrogen from a rectification column is used to clean as well as to cool a reversing heat exchanger or a set of reversing regenerators. In such an arrangement, the effluent nitrogen becomes contaminated with water, carbon dioxide and other impurities while it passes through the exchanger or regenerator and is usually vented to the atmosphere as waste gas.

A feature of certain embodiments of the invention resides in cleaning the effluent nitrogen after it has come from the exchanger or regenerator, condensing the cleaned gas and using it as high purity liquid nitrogen, either as a reflux liquid or for some other useful purpose.

Another feature of the invention is that nitrogen separated from the process stream in the nitrogen column is not supplied to the oxygen column, only oxygen-rich liquid being fed to the oxygen column from the nitrogen column, nitrogen reflux for the oxygen column being supplied from reconditioned nitrogen effluent produced as above described.

The terms "nitrogen column" and "oxygen column" as used herein relate respectively to the primary column and secondary column of a two-column air separation system.

The increased commercial importance of high purity liquid nitrogen in large quantities has made it desirable to consider ways and means for producing additional liquid nitrogen in plants or plant designs originally intended mainly for producing oxygen or mainly oxygen and argon. Although a separate plant may be provided for producing additional quantities of liquid nitrogen, the separation of the air in an oxygen plant into oxygen and nitrogen fractions is a necessary step and once that has been done, liquid nitrogen may be obtained more economically, particularly in accordance with an advantageous feature of the present invention, by processing the nitrogen which has already been separated. It is necessary to add sufficient refrigeration to the system to make up for the cold which leaves the system with the product liquid nitrogen which is removed from the system. However, no additional power is required for separation and no additional columns are needed.

In a plant of the usual type including a high pressure primary or nitrogen column and a low pressure secondary or oxygen column, the effluent nitrogen at the top of the nitrogen column is of the highest purity of any nitrogen in the system and is commonly taken off, condensed and used as liquid nitrogen product and as reflux liquid for the nitrogen column. Some of this liquid nitrogen or some less pure liquid nitrogen which may be collected lower down in the nitrogen column is usually used as reflux for the oxygen column. Effluent nitrogen which collects at the top of the oxygen column is less pure than the effluent from the nitrogen column and is commonly used to clean and cool the reversing heat exchanger or a set of reversing regenerators and is then vented to the atmosphere as waste nitrogen.

In accordance with the invention, little or no nitrogen from the nitrogen column is used as reflux for the oxygen column. Except for what is needed to reflux the nitrogen column, all of the nitrogen produced in the nitrogen column may be taken off as product liquid nitrogen, thereby increasing the liquid nitrogen output of the system, while providing, in a closed cycle, reflux liquid nitrogen of the highest available purity for use in the rectification process in the nitrogen column.

The reflux liquid for the oxygen column, on the other hand, need not be as pure as the reflux for the nitrogen column, and may be provided by condensing some of the effluent nitrogen from the top of the oxygen column. Before being condensed the effluent gas may be passed through the reversing heat exchangers or regenerators where it performs its usual function of cooling the exchangers or regenerators and cleansing them of water and carbon dioxide. The gas thus contaminated may then be compressed, dried, cleaned, refrigerated, freed of lubricating oil from compressors in an oil adsorber, subcooled, and delivered as liquid reflux to the top of the oxygen column. Alternatively, a portion of the gas, cleaned, dried, and refrigerated, may be used to condense another portion of the gas by heat exchange. In either case, this gas may be reused continually in a closed cycle.

Inasmuch as the recycled effluent nitrogen from the oxygen column is not vented away after it has performed the function of cleaning the reversing heat transferring device, but is in turn cleaned and recirculated, this nitrogen provides substantially unlimited available reflux liquid for the oxygen column. It will be noted that any desired amount of the effluent nitrogen produced in the oxygen column may be passed through the recycle, only any excess being vented away. The nitrogen in the recycle may be circulated through the reversing heat transferring device at any reasonable mass flow rate required to balance the mass flow rate of incoming process air which is accommodated by the reversing heat transferring device. This manner of operation is distinctly advantageous over prior art processes in which it is often difficult to produce sufficient waste gases to balance the mass flow requirements of reversing type heat transferring means such as reversing regenerators and reversing heat exchangers. It has sometimes been necessary in the past to use not only waste nitrogen gas but also to collect possibly salable oxygen gas from various locations in the plant in order to provide sufficient gas to properly cleanse the contaminated passages of the reversing heat transferring devices.

According to one embodiment of the invention, the effluent nitrogen from the top of the oxygen column is not used to clean reversing exchangers or regenerators, thereby saving it from contamination by water, carbon dioxide or other impurities, and the clean gas thus obtained is liquefied and returned to the oxygen column as reflux. In this case, the incoming air is freed of water and carbon dioxide by means which do not involve removing these substances from the system in a stream of the effluent nitrogen.

Other objects, features and advantages will appear from the following more detailed description of an illustrative embodiment of the invention, which will now be given in conjunction with the accompanying drawings.

In the drawings,

FIG. 1 is a schematic flow sheet of a nitrogen recycle in which a portion of the waste nitrogen from an oxygen column is used to scavenge water and carbon dioxide from a reversing type heat transferring device and is thereafter cleaned and refrigerated and used to liquefy through heat exchange another portion of the waste nitrogen from the oxygen column to supply liquid nitrogen for refluxing the oxygen column;

FIG. 2 shows a modification of the flow sheet of FIG. 1 to provide direct liquefaction of the cleaned and refrigerated waste nitrogen and its reintroduction into the oxygen column as reflux;

FIG. 3 shows another modification of the flow sheet of FIG. 1, showing alterations made advisable when a centrifugal expansion engine is substituted for a piston-type engine;

FIG. 4 is a diagram showing how FIG. 4a and FIG. 4b are to be adjoined to form a complete schematic flow sheet of an illustrative air separation plant embodying a nitrogen recycle according to the invention, FIG. 4a showing mainly the environment of the invention, and FIG. 4b showing mainly components of the nitrogen recycle, interconnections between FIG. 4a and FIG. 4b showing correlation of the nitrogen recycle with the remaining portions of the air separation system; and FIG. 5 is a schematic flow sheet of a nitrogen recycle in which the waste nitrogen is not allowed to be contaminated by scavenging a reversing type heat transferring device, the air intake stream being freed from water and carbon dioxide by nonfouling means.

Referring to FIG. 1, the upper portion of the low pressure (oxygen) column 10 of an air separation system is shown with a conduit 12 leading up from the top for taking off the overhead or effluent vapor (nitrogen) of fairly high purity. The conduit 12 divides into branches 14 and 16, the branch 14 being connected to a heat exchange coil 18 within a nitrogen condenser 20, which is in turn connected to a conduit 22 leading into the upper portion of the column 10 for delivering liquid reflux to the column.

To provide a refrigerant in contact with the coil 18, a portion of the effluent nitrogen is taken off through branch 16 and subjected to a refrigeration cycle. Before being refrigerated, the effluent nitrogen is used in well known manner to subcool a product, for example nitrogen from the top of the high pressure (nitrogen) column in a subcooler 24 and to cool and clean a heat transferring means 26, for example a heat exchanger or a set of regenerators, of the reversing type which contaminates the nitrogen passing therethrough. The effluent nitrogen from branch 16 is led into one passage 28 of the subcooler 24 by means of a conduit 30 which also receives exhaust nitrogen vapor via an outlet conduit 32 connected to the shell of the condenser 20. Product liquid nitrogen or other stream to be cooled is introduced into passage 34 of subcooler 24 through a conduit 36 and out through a conduit 38 in heat exchange with the vapor in passage 28.

A set of check valves 25a, 25b, 25c and 25d is provided which cooperates with a reversing valve 423 to control connections to and from the reversing heat transferring means 26. A conduit 40 connects the outlet of passage 28 to the junction point of the check valves 25a and 25b, while a conduit 40a connects the junction point of the check valves 25d and 25a to the cold end of passage 42, shown in the figure as the lower end of the passage. A conduit 428a connects the cold (bottom) end of passage 44 to the junction of the check valves 25b and 25c, while a conduit 428 connects the junction of the check valves 25c and 25d with the air stream inlet to the primary column of the liquefaction system, shown fragmentarily as column 400, commonly known as the nitrogen column. The air stream is fed in through an inlet conduit 41 to a compressor 412 and thence through an air receiver 414 and an air filter 416 to a conduit 46 which leads to port a of a reversing valve 423. A conduit 46a connects from a port b of the reversing valve 423 to the warm (upper) end of the passage 44, while a conduit 50a connects from the warm end of passage 42 to a port d of the reversing valve 423. From a port c of the reversing valve 423, the contaminated nitrogen gas is taken off by means of a conduit 50 and divided, part going to a blower 52 and vent 54 to atmosphere, and part to a compressor 56 driven by a motor 58.

The operation of the reversing arrangements for the reversing heat transferring means will now be described. Assuming first that the reversing valve 423 is in the state shown in the figure, that is, with port a connected to port b and port c connected to port d, the incoming air stream, under elevated pressure generated by the compressor 412, passes through conduits 46 and 46a to the warm end of passage 44 wherein the air stream is cooled by heat exchange with cold waste nitrogen in passage 42, incidentally contaminating passage 44 with water and carbon dioxide condensed from the air stream in passing. The air stream, cooled and cleaned of water and carbon dioxide, emerges from passage 44 by way of conduit 428a. The stream, being under high pressure, closes check valve 25b and passes through the check valve 25c, closing the check valve 25d and passing through the conduit 428 to the inlet of the primary column 400. The effluent nitrogen in the conduit 40, being at lower pressure than the air stream, cannot force its way through the closed check valve 25b, but flows through the check valve 25a to the cold end of passage 42. The closed check valve 25d prevents the effluent nitrogen from passing to the air stream conduit 428. The nitrogen passing through the passage 42 takes up heat from the air stream in the passage 44 and at the same time takes up water and carbon dioxide from passage 42 and carries them along, thereby cleaning passage 42 which previously had been contaminated by the air stream. The nitrogen stream leaves passage 42 by way of conduit 50a, ports d and c of the reversing valve 423, and the conduit 50.

Provision may be made in known manner for periodically reversing the valve 423 by means not shown. When the valve is reversed, port a is connected to port d and port b is connected to port c. In this state of the valve, the air stream is directed from conduit 46 through port a, port d, into the warm end of passage 42, and thence through passage 42, to conduit 40a. The air stream then opens check valve 25d and closes check valves 25a and 25c. The air stream passes through check valve 25d and conduit 428 to the inlet of column 400. The nitrogen stream is forced to pass through the check valve 25b to the conduit 428a and through the passage 44 and conduit 46a to port b of the reversing valve, and thence through port c to conduit 50, thereby cooling and cleaning passage 44.

Timing means (not shown) of any conventional sort may be provided for properly operating the reversing valve 423 on a predetermined time cycle.

It will be noted that the refrigeration cycle works on part of the waste nitrogen which comes from the top of the oxygen column and passes through the reversing exchanger. Using waste nitrogen from the reversing exchanger instead of employing an independent closed nitrogen cycle makes it possible to operate the reversing exchanger in the normal manner and insures enough gas passing through the reversing exchanger to clean it thoroughly during each cycle of alternation. Wherever reference is made to a reversing exchanger herein, it will be understood to apply as well to a pair of reversing regenerators.

The waste nitrogen is compressed, for example, to 170 atmospheres, in the compressor 56 and is then dried in a drier 60. It next passes through forecooling exchangers, of which two in serial connection are shown by way of example. The nitrogen passes through conduits 62 and 64 into passage 66 of forecooler 70. Passage 68 of this forecooler may be cooled by any suitable refrigerant coming in by a conduit 72 and leaving by a conduit 74. A conduit 76 connects the outlet of passage 66 to a similar passage in a forecooler 78, from which the forecooled gas is conducted by conduits 80 and 82 to the cylinder of an expansion engine 84 and thence via a conduit 86 to a carbon dioxide filter 88. In the expansion engine the carbon dioxide which the waste nitrogen has taken up in cleaning the reversing exchanger 26 precipitates as snow and is filtered out in the filter 88. The concentration of carbon dioxide at the expander inlet is well under that found in normal air because of dilution by recycled nitrogen gas.

To establish a proper temperature difference between warm and cold fluids in a heat exchanger 94 referred to below, a portion of the nitrogen in conduit 62 can be passed through a conduit 65 into passage 100 of exchanger 94. Alternatively, a reverse flow through conduit 65 may divert some of the flow from a compressor 96 from passage 100 to passage 66. The direction of flow through the conduit 65 will depend upon the initial design of the system for a particular set of operating conditions. The flow of the fluid may be regulated as desired by means of valve 65'.

The cold exhaust from the expander 84 after passing through the filter 88 and a conduit 90 is warmed in heat exchangers 92 and 94 and recompressed in a compressor 96. Some of the compressed, clean nitrogen is cooled by heat exchange with the expanded nitrogen in the exchangers 94 and 92 in that order and then conducted via a conduit 98 and expanded through a valve 99 into the shell of the condenser 20 at a pressure somewhat below atmospheric in order that the cold nitrogen in the shell may condense effluent nitrogen in the coil 18. The nitrogen in the shell of the condenser 20 then completes a closed cycle by entering the conduits 32 and 30 on the way to the product subcooler 24. Whatever liquid nitrogen is produced in the shell of the condenser 20 is vaporized by heat exchange with the coil 18 in the process of condensing effluent nitrogen at low pressure in the coil 18.

The remainder of the clean nitrogen from the compressor 96 which is not used to cool the condenser 20 passes through the separate cooling passage 100 in the heat exchanger 94 or through conduit 64 and forecoolers 70 and 78. These streams recombine in the inlet to the expansion engine 84.

Since the nitrogen in the conduit 50 is below atmospheric pressure, means such as the blower 52 is necessary in order to exhaust to atmosphere surplus nitrogen in the conduit.

Oxygen over and above what is removed from the system as liquid product must not be passed through the reversing exchanger 26 with the waste nitrogen as is commonly done, since it would contaminate the nitrogen in the cleaning and refrigerating cycle just described. Instead, this oxygen, in gaseous phase, is passed through warming passages 102 of exchanger 92 and 104 of exchanger 94 from which it is delivered to a conduit 106 by which it may be transferred to product gas containers or may be vented to the atmosphere. Instead of the cold oxygen gas passing its refrigeration to the reversing exchangers, this refrigeration is recovered by the auxiliary nitrogen cycle by means of the heat exchangers 92 and 94. This change in procedure has the advantage over the earlier procedure in that the oxygen gas can be recovered as a salable product.

The making of increased amounts of liquid nitrogen as disclosed herein changes somewhat the operation of the reversing exchangers, in that it increases the mass flow rate of nitrogen through the reversing exchangers. This increase in mass flow rate improves the effectiveness of removal of water and carbon dioxide from the exchangers as the nitrogen passes through. The system of FIG. 1 runs with the outlet sides of the reversing exchangers under less than atmospheric pressure, thereby increasing the efficiency of removal of water and carbon dioxide without any accompanying disadvantage. While the system requires that no oxygen be discharged through the reversing exchangers, the loss of the mass flow of the oxygen is not sufficient to offset the increased flow of nitrogen.

Indirect heat exchange in the nitrogen condenser 20 of FIG. 1 will require additional power in the compressor 96 to obtain a sufficiently high pressure to provide the necessary refrigeration. This power may be saved by putting the recycle liquid nitrogen directly into the top of the oxygen column, as shown in FIG. 2. The modified scheme makes it unnecessary to expand the nitrogen to below atmosphereic pressure, thereby avoiding the need for the blower 52. In this arrangement, the conduit 12 delivers the effluent nitrogen from the top of the oxygen column 10 directly into the conduit 30 and thence to the product subcooler 24. The outlet conduit 98 from the refrigerating cycle delivers partially liquefied nitrogen to a separator 108. Residual vapor from the top of the separator is vented through a conduit 110 to the conduit 30 to mix with the incoming effluent gas from the top of column 10, and th liquid nitrogen collects in the bottom of the separator and is passed through an oil filter 112 to the conduit 22 which latter delivers the liquid nitrogen to the top of the column 10 as reflux. The filter removes any lubricating oil or hydrocarbon which may get into the liquid nitrogen from the compressors 56 and 96. Such material, if it were not removed, could be carried down the oxygen column with the reflux and contaminate the liquid oxygen at the bottom of the column. The filter 112 may be mechanical in nature or may involve or be supplemented by the use of activated charcoal or other adsorbents.

Since low pressure in the reversing exchangers is advantageous, the system of FIG. 2 may be run with the outlet sides at atmospheric pressure instead of at the pressure of the oxygen column (commonly about 18 p.s.i.a.). This will require a small increase in power to operate the system.

In case it is desired to use an expander of the centrifugal type as the expander 84, the system of FIG. 1 may be modified as shown in FIG. 3. Such modification is occasioned by the fact that centrifugal expanders are best suited for operation under moderate pressure drops. It is thus advantageous to lower the pressure of the gas fed to the expander. This increases the volume of gas to be circulated and, therefore, requires that the exchangers be made larger to accommodate this added gas flow. The scheme also requires additional power to operate. For example, if the inlet to the expander is at 20 atmospheres, instead of 170 atmospheres, the amount of power required is increased by about 6 percent. It will be evident that a similar modification may be made in the system of FIG. 2.

Referring to FIG. 3, a conduit 97 extends from an intermediate stage of compressor 96, at, for example, 20 atmospheres, to the conduit 65 and passage 100. To match this intermediate pressure, the outlet pressure of the compressor 56 should be reduced to the same value. The pressure difference between the inlet and outlet sides of the expansion engine 84 is then that between the input of the compressor and the output of the intermediate stage. The final stage of the compressor 96 raises the pressure the rest of the way, for example to 170 atmospheres.

A portion of the nitrogen vapor from the shell of the condenser 20 is taken off via a conduit 118 and returned to the compressor 96 by way of heat exchangers 92 and 94 and an additional heat exchanger 120 in heat exchange with compressed gas from the compressors coming through conduit 98, the passage 122 of exchanger 120 and a conduit 124 back to the shell of the condenser 20. The exchanger 120 serves to recover residual refrigeration for conduit 124 which is not absorbed in conduit 98. The improved processes and apparatus disclosed herein provide for increased nitrogen production either in new plants or when incorporated in existing plants. The increased nitrogen production so obtained does not interfere with argon production as would be the case if the amount or purity of liquid nitrogen reflux in the oxygen column were decreased due to increased withdrawal of liquid nitrogen as product at the expense of available reflux. On the contrary, the added nitrogen cycle provides ample reflux together with increased production of liquid nitrogen for withdrawal. In fact, by increasing the reflux on the oxygen column beyond what is ordinarily available, argon recovery can be improved beyond present commercial levels with very little additional expense. Increased refrigeration is necessary in the nitrogen recycle to effect greater recovery of argon, but a major portion of the additional power required to provide the extra refrigeration will be recovered in the oxygen column reboiler. Reflux may be increased in amount up to a limit imposed by the size of the oxygen column and its reboiler. To effect the expected improvement in argon recovery, care must be taken to preserve sufficiently high purity in the effluent nitrogen at the top of the oxygen column, as by the measures disclosed herein.

Alternatively to the process of snowing out the carbon dioxide, conventional soda towers or caustic scrubbers may be used, or other expedients such as low temperature gas phase adsorbers employing silica gel, and molecular sieves.

FIGS. 4a and 4b show further details of an air separation system embodying the invention, certain numerals applied to the illustrations of the other figures being applied to corresponding portions of the system in these figures. FIG. 4a comprises mainly the conventional portions of the system, but includes certain significant modifications involving the invention. FIG. 4b comprises mainly added components required in the nitrogen recycle whereby the effluent nitrogen from the top of the oxygen column after contamination in the exchangers or regenerators is cleaned and refrigerated for delivery to the upper portion of the oxygen column as high purity nitrogen reflux liquid.

Referring first mainly to FIG. 4a the oxygen column 10 is shown together with a combined nitrogen column and scrubber 400 and an auxiliary column or argon attachment 402. The particular plant illustrated is designed to product products of liquid nitrogen at a valve 404, liquid oxygen at a valve 406, and liquid argon at a valve 408.

Air is fed in through an inlet conduit 410 to a compressor 412 and thence through an air receiver 414 and an air filter 416 to a pair of reversing heat exchangers 418 and 420, each of which exchangers has three passages. A pair of reversing valves 422 and 424 are provided at the warm end of the respective exchangers whereby the air stream from filter 416 may be directed either into the extreme right hand passage of each exchanger or into the extreme left hand passage of each. A set 426 of check valves is provided at the cold end of the exchangers, in the usual manner, whereby waste nitrogen may be directed into either the right hand or left hand passage of each exchanger. These check valves operate similarly to the check valves 25a, 25b, 25c, and 25d shown in FIG. 1. Following the usual course of the liquefaction process, the air from the reversing exchangers, which normally is substantially at saturation, is fed into the lower part of the scrubber section of column 400 by way of a conduit 428. The air is partially rectified in column 400 at about 6 atmospheres, producing high purity nitrogen vapor at the top of the column, an oxygen-rich argon-carrying liquid commonly called rich liquid collected in a trough or shelf 430, and a small residual amount of liquid containing impurities such as hydrocarbons and other high boiling constituents such as krypton and xenon at the base of the column. The latter liquid may be purged through a valve 432 or combined with rich liquid from the trough 430 in a conduit 434.

Usually, the nitrogen effluent from the top of column 400, after being condensed, is used not only for product nitrogen but also as reflux liquid both for the nitrogen column 400 and for the oxygen column 10.

In accordance with the invention, all or most of the nitrogen separated from the process stream in the nitrogen column over and above what is needed as reflux for the nitrogen column is converted into product liquid nitrogen and little or none is passed on to the oxygen column.

The effluent nitrogen gas from the top of the nitrogen column 400 is taken off at about −285° F. in a conduit 436 and through a coil 438 in an oxygen reboiler 440 connected to the bottom of the oxygen column 10. The nitrogen is partially condensed in the coil 438 and completely condensed in a nitrogen condenser 442. The liquid nitrogen in the bottom of the condenser 442 is pumped to the upper portion of the column 400 by means of a pump 444 and supplied as reflux to the column through a conduit 446. The liquid nitrogen not so pumped is forced by the pressure within the nitrogen column through the shell of a subcooler 448 and the conduit 38 to valves 404 and 450. By closing valve 450 and opening valve 404 all the liquid nitrogen in the conduit 38 may be taken off as product liquid nitrogen. If desired, a portion of the liquid nitrogen may be delivered through valve 450 as part of the reflux for the oxygen column, but for maximum nitrogen production, it will be preferable to keep valve 450 closed.

Only the material in the conduit 434 is transferred from the nitrogen column to the oxygen column. This material, namely rich liquid at about −277° F., is passed through the coil of a heat exchanger 452 to a silica gel adsorber 454 wherein impurities such a hydrocarbons in the incoming air stream are removed. The cleaned liquid is then expanded in a throttle valve 453 and passed in heat exchange with the incoming stream to the adsorber in the shell of the heat exchanger 452. The liquid then is directed to an argon condenser 456 where the rich liquid is partially evaporated by heat exchange with condensing argon vapor. The still unvaporized liquid phase passes from the condenser 456 to a head condenser 458 in the argon column 402 where the rich liquid is further vaporized. Liquid and vapor phases from the condensers 456 and 458 are combined and fed to an intermediate portion of the oxygen column 10 at about 18 p.s.i.a. through a conduit 460 and suitable valves.

High purity liquid oxygen collects in the bottom of the oxygen column 10 and in the oxygen reboiler 440. This liquid at about −290° F. is supplied to the valve 406 by means of a pump 462 and may be taken off through valve 406 as liquid oxygen product.

Argon-rich vapor is taken off via a conduit 461 from an intermediate portion of column 10 where argon concentration is highest (usually 10–14% argon) and is passed upward through the argon column 402 to the head condenser 458 where the reflux is condensed, and rectified crude argon vapor which results passes through a conduit 464 at the top of the argon column to the argon condenser 456 where the argon is condensed by heat exchange with rich liquid. The liquid argon in the bottom of the condenser 456 may be taken off by means of the valve 408. Residual liquid in the bottom of the argon column 402 drains back into the oxygen column through a conduit 466 at about the same level as the conduit 461.

The main source of reflux for the oxygen column 10 in accordance with the invention comes from effluent nitrogen at the top of column 10 which is condensed after being used in the usual manner to clean and cool the reversing exchangers 418 and 420.

The effluent nitrogen from the top of the oxygen column 10 is taken off through conduit 12 to the coil of the subcooler 24 where it serves to subcool the product liquid nitrogen in the shell of this subcooler. The effluent nitrogen at about −291° F. then passes through the conduit 40 to the reversing exchangers 418 and 420 by way of the set 426 of check valves. From the reversing exchangers, the effluent nitrogen, now contaminated with water and carbon dioxide, passes to the cleaning and refrigerating components, shown mainly in FIG. 4b.

In FIG. 4b, the conduits 468 and 470 have their contents mixed and fed to the first stage of a multi-stage compressor 472. Surplus nitrogen from conduits 468 and 470 may be vented to the atmosphere through valves 469 and 471, respectively. From the outlet of a second stage of the compressor 472, the compressed gas is delivered via a conduit 474 (which may be paralleled by a surge tank 475) to a caustic scrubber 476, from which it goes to a cooler 478 employing any suitable coolant, in which the nitrogen is cooled sufficiently for effective drying in drier 60. The cooled gas from drier 60 goes back through a conduit 480 to a third stage of the compressor 472. The gas is further compressed in successive stages, for example three stages as shown, and passed through another refrigerating stage 482. The gas is next cleaned of lubricating oil from the compressor by means of an oil adsorber 484, passed through the coils of a pair of warm exchangers 486 and 488, another refrigerator 490, the coils of a pair of cold exchangers 492 and 494 and an expansion valve 496 and the conduit 98 to the separator 108. By the time the nitrogen reaches the separator 108 it is mainly liquefied and the liquid is drawn off from the bottom of the separator 108 through the coil of a subcooler 498 to the oil adsorber 112 from which it is conducted by way of a conduit 500 to the conduit 22 near the top of the column 10 (FIG. 4a) where it is introduced into the column as reflux. In the FIG. 4b system, the nitrogen is expanded and held in the separator 108 at some intermediate pressure above the pressure of the oxygen column 10 (9 atmospheres, for example). The liquid nitrogen delivered by conduit 500 is then throttled in valve 501 to the column pressure.

Oxygen gas which boils off from the liquid in the bottom of column 10 is taken off through a conduit 502 to the shell of the exchanger 492 where it helps to cool the recycle nitrogen in the coil of that exchanger, after which it passes through the shell of the exchanger 486 where it further helps to cool the nitrogen, and may then be vented to the atmosphere by means of a valve 506. As before mentioned, refrigeration is recovered from this oxygen gas while at the same time the oxygen is not allowed to pass through the reversing exchangers where it would contaminate the high purity nitrogen which is needed to reflux the oxygen column.

A portion of the liquid nitrogen in the coil of the subcooler 498 is expanded through a valve 528 and fed back to the shell of the subcooler 498 and then may be sent either via a valve 529 and conduit 530 to the shell of exchanger 492 and thence through the shell of the exchanger 486 to vent through valve 506, in which case the nitrogen mixes with oxygen from column 10, or through a valve 532 and a conduit 534 to become mixed with the effluent nitrogen from conduit 12 in the coil of the subcooler 24. The latter procedure is advantageous in that it leaves the gaseous oxygen in conduit 502 uncontaminated by nitrogen so that the oxygen is recoverable as a salable product, at the valve 506.

Refrigeration for the purpose of condensing nitrogen in the condenser 442 for product and for refluxing the nitrogen column is provided by means of a closed auxiliary nitrogen cycle including a compressor 540 (FIG. 4a). Lubricating oil from the compressor is removed from the compressed nitrogen gas in an oil filter 542. A portion of the warm, clean gas from the filter 542 is passed through the coil of a warm exchanger 544. Another portion of this gas is passed through a refrigerator 546 and, together with the first portion that has been partially cooled in the exchanger 544 is passed through the coil of a cold exchanger 548 and thence through a reboiler coil 550 submersed in the rich liquid in the bottom of the scrubber portion of the nitrogen column. From the coil 550 the nitrogen, mostly liquefied, passes through a surge drum 551 into the condenser 442, any accompanying vapor remaining in the top of the surge drum. The cycle nitrogen liquid in the condenser 442 is evaporated by heat exchange with the condensing nitrogen vapor in the condenser and the vaporized cycle nitrogen together with vapor from the top of the surge drum 551 passes through a conduit 552 and the middle, nonreversing passages of the exchangers 418 and 420, and back to the compressor 540. Additional refrigeration for the cycle is introduced by taking off a portion of the stream from the outlet of the coil of exchanger 544, expanding it in an expansion engine 554 and introducing the expanded gas into the shell of the cold exchanger 548 along with some of the vapor from surge drum 551 and the condenser 442. This refrigerated stream passes from the shell of cold exchanger 548 to the shell of warm exchanger 544 and thence to the inlet of the compressor 540. Initial filling of this cycle and occasional making up for leakage losses may be done from effluent nitrogen in conduit 436 by means of a valved line 556.

FIG. 5 shows an illustrative arrangement in which the effluent nitrogen from the oxygen column is kept from being contaminated by the incoming air stream, while still utilizing the effluent nitrogen to cool the incoming air stream, and condensing the clean effluent nitrogen to form liquid nitrogen to reflux the oxygen column. In this arrangement, the incoming air stream is cleaned and dried in nonfouling units which are not of the reversing type and do not require to be scavenged by the effluent nitrogen. Air is admitted through a conduit 558 to an air compressor 560. The compressed air stream is freed of carbon dioxide in a caustic tower 562 and of water vapor in the drier 60. The cleaned air stream is passed through a nonreversing passage 564 of a heat exchanger 566 wherein it is cooled by heat exchange in countercurrent relationship to one or more streams of cold gas in adjacent passages of the exchanger, and fed to the primary column (not shown) through the conduit 428. One of the cooling streams may comprise nitrogen gas available elsewhere in the air separation system, passing counter-currently through a passage 568.

In the effluent nitrogen recycle portion of the arrangement of FIG. 5, the conduit 12 delivers the effluent nitrogen from the top of the oxygen column 10 to the conduit 30 and thence to the passage 28 of the product subcooler 24. A process stream to be cooled, for example product liquid nitrogen is introduced into passage 34 of subcooler 24 through conduit 36 and out through conduit 38. The conduit 40 connects the passage 28 of subcooler 24 to a passage 570 in the exchanger 566 in counter-current heat exchanging relation with passage 564 wherein the effluent nitrogen is warmed in cooling the incoming air stream. The warmed nitrogen is delivered through the conduit 50 to the compressor 56. Surplus nitrogen gas in the conduit 50 may be vented to the atmosphere through a conduit 572. The compressed nitrogen gas passes through conduits 62 and 64 into passage 66 of forecooler 70 and thence through conduit 76, forecooler 78, and conduits 80 and 82 to the cylinder of the expansion engine 84.

The cold exhaust from the expander 84 passes via conduit 90 to heat exchangers 92 and 94 wherein it is warmed on the way to the compressor 96 by compressed gas coming from the compressor. The compressed gas from the exchanger 92 is expanded through the throttle valve 99 in the conduit 98 and is mainly liquefied upon such expansion. The liquid nitrogen is collected in the separator 108, freed of lubricating oil in the oil filter 112, and delivered to the top of the oxygen column 10 as reflux. Residual vapor from the separator 108 is vented through the conduit 110 and mixed with the effluent nitrogen gas in conduit 30 for recycling.

It will be understood that the invention is not limited to any specific form of refrigerating means or refrigeration cycle for cooling the waste nitrogen drawn from the top of the oxygen column, the only requirement being that the effluent be liquefied. Furthermore, removal of water, carbon dioxide and oil, whether it be from the nitrogen stream fouled by a heat exchanger or regenerator, or whether it be from an incoming air stream, may be effected in any available manner.

While illustrative forms of apparatus and methods in accordance with the invention have been described and shown herein, it will be understood that numerous changes may be made without departing from the general principles and scope of the invention.

What is claimed is:

1. In apparatus for a system for separation of the elements of air, in combination, an oxygen column, heat transferring and purifying means for cooling and purifying an incoming process stream to the system having at least two passages, one of which at a given time is being cooled and cleaned of deposited impurities by a first gas stream passing therethrough, the other passage serving to cool and collect deposited impurities from a second gas stream passing therethrough, means for interchanging said gas streams relatively to said passages, said first gas stream comprising waste nitrogen gas from the top of said oxygen column and said second stream comprising said process stream to be cooled, non-fouling means connected to said heat transferring means for purifying said first gas stream upon leaving said heat transferring means, means for refrigerating said purified stream, whereby said first stream is at least partially liquefied, and means to conduct said waste nitrogen so liquefied to said oxygen column as reflux.

2. In apparatus for a system for separation of the elements of air, in combination, an oxygen column, heat transferring and purifying means for cooling and purifying an incoming process stream to the system having at least two passages one of which at a given time is being cooled and cleaned of deposited impurities by a first gas stream passing therethrough, while the other passage is serving to cool and collect deposited impurities from a second gas stream passing therethrough in counter-current relation to said first stream, means for periodically interchanging said gas streams relatively to said passages, said first gas stream comprising a portion of the waste nitrogen gas from the top of said oxygen column and said second stream comprising said process stream to be cooled, means for purifying said first gas stream upon leaving said heat transferring means, means for refrigerating said purified stream, means to liquefy another portion of the waste nitrogen from the top of said oxygen column by heat exchange with said refrigerated, purified stream, means to return said liquefied portion of waste nitrogen to said oxygen column as reflux for a rectification process in said column, and means to return said refrigerated, purified stream to join said first gas stream entering said heat transferring means.

3. A waste nitrogen recycle system for refluxing a low pressure oxygen column in an air separation plant, comprising, in combination, means for taking off waste nitrogen vapor from top of said oxygen column and conducting it to the cold end of a subcooler wherein said vapor subcools a process liquid stream, means connected to the warm end of said subcooler for conducting warmed waste nitrogen vapor to a passage in a reversing heat transferring device wherein said vapor transfers refrigeration to another process stream within the plant to be cooled and at the same time takes up water and carbon dioxide previously deposited in said passage by a process stream being cooled, means connected to the warm end of said reversing heat transferring device for compressing said warmed waste nitrogen, nonfouling means for removing water from said compressed waste nitrogen, means for expanding said compressed waste nitrogen with performance of mechanical work, nonfouling means for removing carbon dioxide from said expanded waste nitrogen, means for recompressing said waste nitrogen freed from carbon dioxide, means to expand and liquefy said cleaned, recompressed waste nitrogen, means to remove from said liquefied nitrogen such lubricating oil as may have entered the nitrogen recycle from said expander and said compressors, and means to conduct said cleaned, substantially oil-free liquid nitrogen into said oxygen column as reflux.

4. A process of separating the elements of air employing a heat exchange means for cooling a process air stream and collecting therein deposited impurities condensed from said air stream, rectifying the thus purified air stream to form a relatively high boiling point oxygen-rich fraction and a relatively low boiling point nitrogen-rich effluent, utilizing at least a portion of said nitrogen-rich effluent to cool said process air stream and remove the deposited impurities from said heat exchanger means by permitting said process stream and said nitrogen effluent stream to flow intermittently through respective passages of said heat exchange means, removing the impurities picked up in said nitrogen-rich effluent stream, cooling said effluent stream and utilizing the refrigeration thereby imparted to said effluent stream to at least partially liquefy the nitrogen effluent obtained from said rectification, returning said liquefied effluent to said rectification as liquid reflux therefor and utilizing the gaseous remainder to cool said process air stream.

5. In apparatus for a system for separation of the elements of air, in combination, means including a high pressure primary column for rectifying a process stream of air into a vapor fraction comprising nitrogen of high purity and an oxygen rich liquid fraction, means for liquefying said vapor fraction, means utilizing a portion of the nitrogen so liquefied as the sole liquid reflux for said primary column, means for withdrawing from said air separation apparatus as a product substantially the entire remainder of the liquefied nitrogen, means including a low pressure secondary oxygen column for rectifying said oxygen-rich liquid fraction independent of reflux of any other fraction within the system of said process air stream into effluent nitrogen of lesser purity than the nitrogen produced in said primary column and a residual liquid fraction, heat transferring and purifying means having at least two passages, one of which at a given time is being cooled and cleaned of deposited impurities by a first gas stream passing therethrough, the other passage serving to cool and collect deposited impurities from a second gas stream passing therethrough, means for interchanging said gas streams relatively to said passages, said first gas stream comprising waste nitrogen gas from the top of said oxygen column and said second stream comprising a process stream to be cooled, non-fouling means connected to said heat transferring means for purifying said first gas stream upon leaving said heat transferring means, means for refrigerating said purified stream, whereby said first stream is at least partially liquefied, and means to conduct said waste nitrogen so liquefied to said oxygen column as reflux.

6. In a process for separating the elements of air, employing air cleaning and drying means, a primary high pressure rectifying column and a cooperating secondary low pressure rectifying column, the steps of separating a substantial portion of the nitrogen in vapor phase from an air stream in said primary column, liquefying said nitrogen vapor, employing a portion of the resultant liquid nitrogen as the sole reflux for said primary column, withdrawing from the process as a product for use outside of said low pressure column substantially the entire remainder of said liquid nitrogen, removing rich liquid from the high pressure column, introducing said rich liquid into said low pressure column, leading off effluent nitrogen gas from the top of said secondary column, passing said effluent nitrogen gas through said air cleaning and drying means to take up materials deposited therein by an air stream to be used by said process while said air stream was being cleaned and dried, whereby said effluent gas is contaminated by the materials so taken up, removing said taken-up materials from said effluent gas, liquefying the decontaminated gas, and returning it as reflux to said secondary column.

References Cited in the file of this patent
UNITED STATES PATENTS

| | | |
|---|---|---|
| 2,084,474 | Booth | June 22, 1937 |
| 2,214,790 | Greenwalt | Sept. 17, 1940 |
| 2,227,953 | Baehr | Jan. 7, 1941 |
| 2,258,016 | Keith | Oct. 7, 1941 |
| 2,482,304 | Van Nuys | Sept. 20, 1949 |
| 2,498,806 | Hachmuth | Feb. 28, 1950 |
| 2,545,778 | Haringhuizen | Mar. 20, 1951 |
| 2,552,451 | Patterson | May 8, 1951 |
| 2,575,341 | Gollmar | Nov. 20, 1951 |
| 2,619,813 | Schuftan | Dec. 2, 1952 |
| 2,743,590 | Grunberg | May 1, 1956 |
| 2,823,523 | Eakin | Feb. 18, 1958 |
| 2,827,775 | Linde | Mar. 25, 1958 |
| 2,862,819 | Hongen | Dec. 2, 1958 |
| 2,955,434 | Cost | Oct. 11, 1960 |
| 3,036,439 | Haringhuizen | May 29, 1962 |